United States Patent [19]

Ramney

[11] 4,068,624
[45] Jan. 17, 1978

[54] REFILLABLE PERMANENT COLLAR FOR ANIMALS

[75] Inventor: Tiberius Ramney, Freehold Township, N.J.

[73] Assignee: Bio-Pet Research Company, Wayne, N.J.

[21] Appl. No.: 688,933

[22] Filed: May 21, 1976

[51] Int. Cl.² ............................................. A01K 27/00
[52] U.S. Cl. ..................................... 119/106; 119/156
[58] Field of Search .............. 119/106, 109, 156, 160; 2/312, 311, 316; 239/54, 55, 57, 60; 43/131

[56] References Cited

U.S. PATENT DOCUMENTS

| 2,315,772 | 4/1943 | Closs ........................................ 43/131 |
| 2,349,713 | 5/1944 | Finch ...................................... 119/159 |
| 2,808,030 | 10/1957 | Costanzo ............................... 119/106 |
| 3,811,413 | 5/1974 | Scherpenborg ....................... 119/156 |

Primary Examiner—Louis G. Mancene
Assistant Examiner—Peter K. Skiff
Attorney, Agent, or Firm—Mel K. Silverman; David A. Jackson

[57] ABSTRACT

An animal collar having pre-formed compartments for securing therein tablets of vaporizable active substances, such as insecticides, deodorants, pesticides, germicides and the like. The design of the collar is such that the vapors therefrom are directed away from the fur of the animal.

5 Claims, 10 Drawing Figures

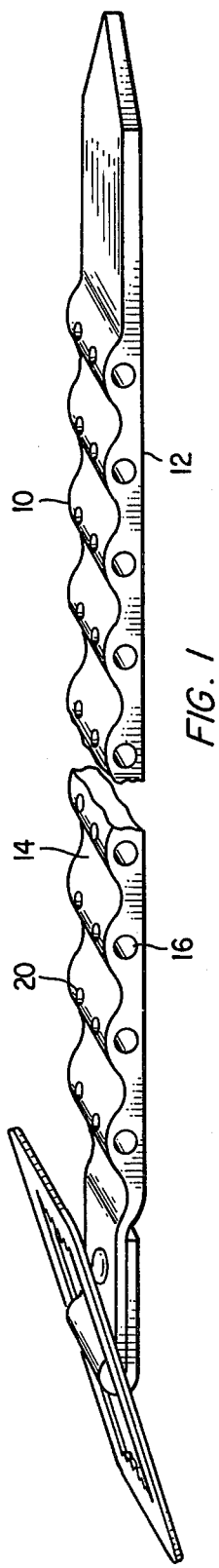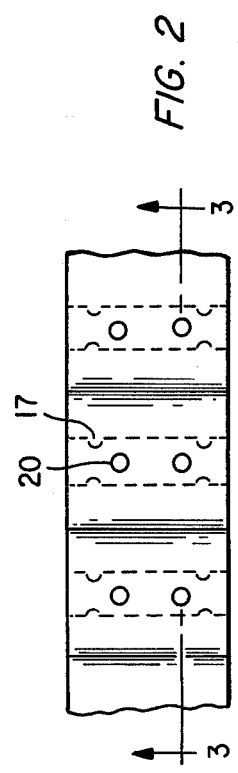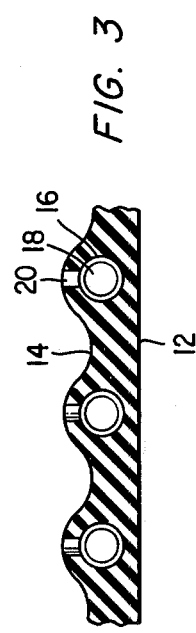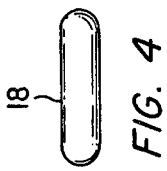

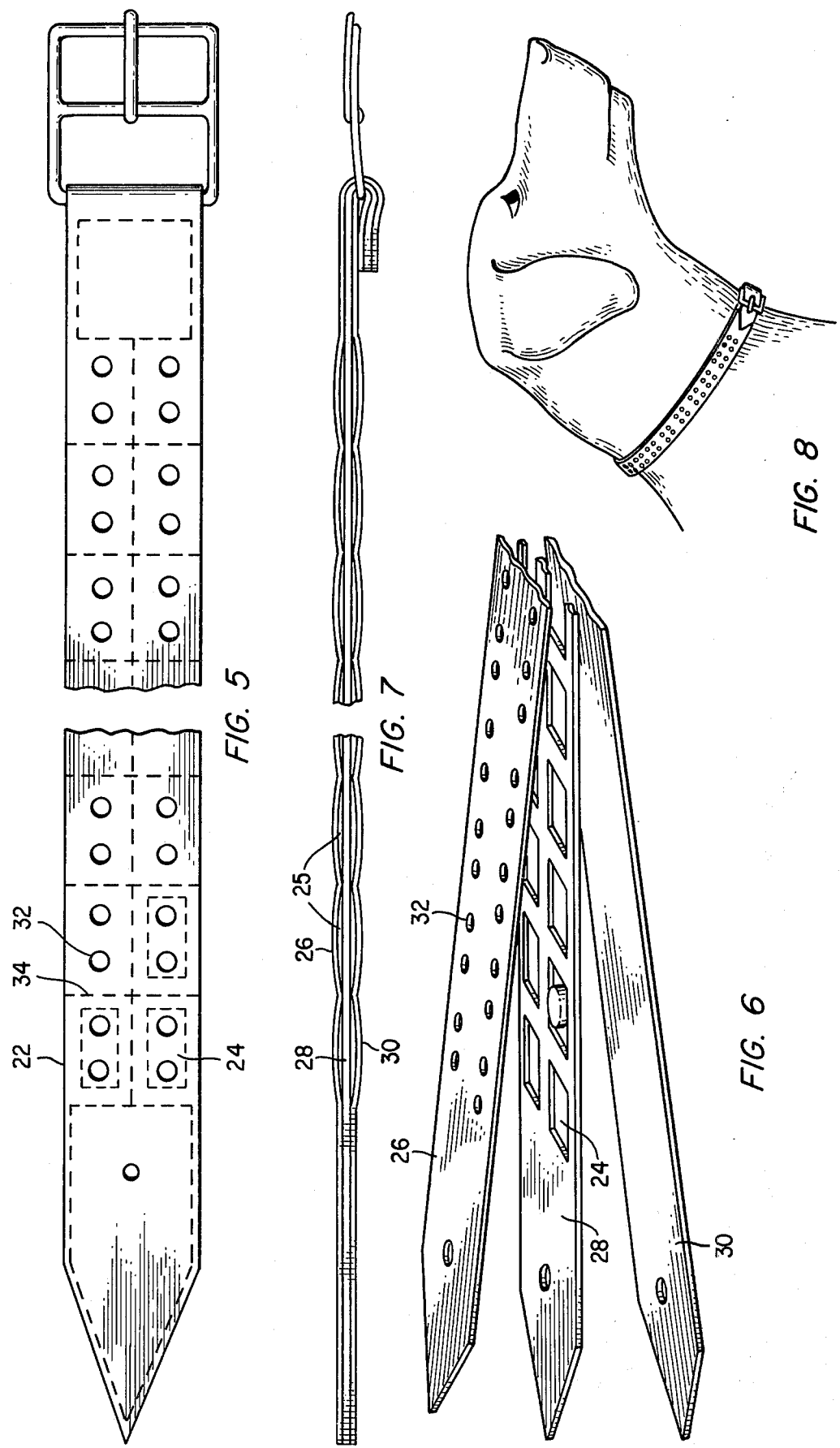

REFILLABLE PERMANENT COLLAR FOR ANIMALS

BACKGROUND OF THE INVENTION

Collars have been long known for placement directly about the neck of a domestic animal, such collars have been formed of plastic materials such as polyvinyl chloride, incorporating therein an active insecticide or deodorant substance. Protective bands of this nature exhibit the disadvantage that the active substance, which evaporates and exudes through the plastic, is in direct contact with the animal's skin or fur. Further, such collars must be thrown away after the active substance therein has become dissipated.

Insecticidal collars have also been proposed for domestic animals, which are constituted of a commercial insecticide contained within a sheet which is perforated on both sides. Such bands, which are prepared so as to diffuse at a given temperature, evaporate at different rates when they are brought in contact with different types of animals or, even the same animal, but at a different age or metabolic condition.

Containers have also been proposed for suspension about the neck of a domestic animal. Such containers have been found to be awkward of use and complex in construction.

The above and other prior art devices have failed to produce a degree of diffusion which is selectably adaptable to each size and breed of animal and which will also take into account special factors such as age.

The prevent invention presents an alternative to the prior art and, in so doing, provides a means for applying to each animal a quantity (however small) of insecticide and deordorant which has been pre-selected in order to conform to the particular metabolic and other physical characteristics of the animal, while, in addition, focusing the escape of vapors in an outward direction, thus protecting the skin or fur of the animal.

SUMMARY OF THE INVENTION

The present invention comprises a refillable permanent animal collar having pre-formed channels or compartments in which may be secured a number of tablets, the quantity of which and the rate of replacement thereof, being a function of the physiological characteristics of the particular animal.

One embodiment of the present invention comprises a collar formed of a resilient thermoplastic material molded in the form of a single, integral, unitary member. Within such a collar, tablets of elongated shape are inserted within one or more of a plurality of passages formed within the resilient material and are held therein by virtue of a friction-pressure relationship between the tablet and the inner surface of the passage. Also, a plurality of holes are provided within the outer surface of the collar in order to permit evaporation of the active substance of the tablets in a direction away from the fur of the animal.

In a second embodiment, the collar is formed of three layers, the middle layer of which contains a multiplicity of pre-formed compartments adapted for the insertion of the tablets thereinto. Also provided is a bottom layer which serves as a protective covering for the animal's fur.

Thus, it is an object of the present invention to provide an animal collar suitable for the reception of insecticide and deodorant tablets, the vapors of which will be directed outwardly away from the fur of the animal.

It is a further object to provide a device of the above type in which the tablets therefore may be easily inserted in a number which may be varied in accordance with the physiological characteristics of a particular animal.

It is a yet further object to provide a collar which will perform an insecticide and deodorant function and which, further, will be refillable, with new tablets, said collar being usuable for an indefinite period.

BRIEF DESCRIPTION OF THE DRAWINGS

FIG. 1 is a perspective view of a first embodiment of the present invention.

FIG. 2 is a top plan view of a segment of the collar of FIG. 1.

FIG. 3 is a cross-sectional view taken along line 3-3 of FIG. 2.

FIG. 4 is a schematic representation of a typical tablet which may be used for insertion into the passages of the collar.

FIG. 5 is a top schematic view of a second embodiment of the present invention.

FIG. 6 is an exploded, half-breakaway view of the embodiment of FIG. 5.

FIG. 7 is a side plan view of the embodiment of FIG. 5.

FIG. 8 is an illustration of the embodiment of FIG. 5, attached about the neck of a dog.

DETAILED DESCRIPTION OF THE INVENTION

Figure 9:
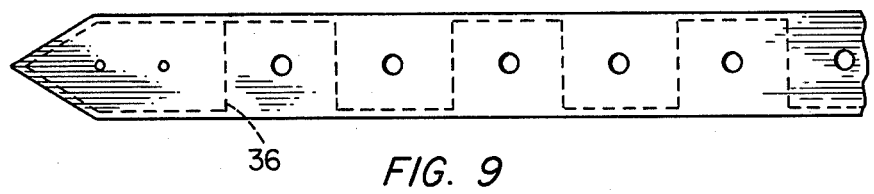
FIG. 9 is a top, partial, breakaway schematic view of a third embodiment of the present invention.

As shown in FIG. 1, a first embodiment of the present invention exhibits a collar 10 having a flat, smooth bottom surface 12 and a top surface 14 which is characterized by an undulating or sinusoidal pattern.

The collar is provided with two types of passages, namely, transverse passages 16 which are provided at both ends with a bottle-neck area 17 (see FIG. 2). The function of the passages 16 is to hold in place the tablets 18 which are placed within said passages. At the top of each of the passages 16 are a plurality of vertical passages or channels 20.

The purpose of said channels is to disperse the vapors, emanating from the insecticide and deodorant tablets, in a direction outwardly away from the collar and away from the fur of the animal, thereby minimizing the possibility of irritation to the pet.

A first embodiment of the collar is formed of a flexible plastic or rubber material. This enables the tablets to be closely and integrally held within the collar.

The tablets 18 are forcibly inserted through the sides and, with the use of a prong or fork, are ejected in similar fashion. Depending on the width of the collar (dog or cat), there will be either one or two pills per passage 16.

It is to be noted that the width of the collar, at its beginning and end, is somewhat thinner in order to allow for ease of strapping or buckling. The buckle, which uses dented catches, does not require any holes in the buckling of the collar.

In a second embodiment of the present invention, shown generally in FIGS. 5 and 6, the collar 22 is made of leather, plastic or other such material and, as in the first embodiment, is provided with a means, such as a buckle, for the securement of the collar around the neck of the animal.

It is seen that the collar 22 exhibits a plurality of rectangular cavities 24 into which, at points 25, are inserted the tablets containing the active substance. See FIG. 7. After a period of time, for example, three months, when the tablets are exhausted, they can be squeezed out of the compartments 24.

In accordance with FIGS. 6 and 7, it is noted that the collar exhibits a sandwich-like construction having three layers of material which comprise a top layer 26, a middle layer 28, and a bottom layer 30. These layers may be sewed or sealed together, utilizing any of a variety of such techniques.

All three of said layers are of sufficient length in order to encircle the neck of the animal. Also, each of said layers are of the same length and width but, however, are of different thicknesses and are constructed in order to attain their desired function. More particularly, the bottom and top layers are generally equal in thickness and serve mainly as supports for the tablets inserted between them. It is, by observation of FIG. 6, to be noted that the middle layer is thicker than the top or bottom layers and, generally, exhibits a thickness equal to the thickness of the tablets.

The top layer also exhibits a plurality of perforations 32 located exactly above the compartments 24, thus permitting the vapors of the active chemicals to be dispersed through said perforations and away from the fur of the animal. The bottom layer serves as a base for the collar and further serves to protect the fur of the animal against the active chemicals within the tablets.

It is to be appreciated that any one or more of a variety of types of tablets may be utilized, e.g., insecticides, deodorants, pesticides, germicides, and repellants.

It is in FIG. 5 to be noted that the dotted lines 34 denote stitching of the belt. The stitching is accomplished in such a fashion so as to permit the tablets to be inserted or slipped through the unsealed edges 25 between the first and second layers and thus into the compartments 24. The rigidity of the stitching is such that the tablets will be held in place within the compartments and cannot be removed therefrom unless the collar is first removed from the neck of the animal.

For small animals, where a relatively narrow collar is required, an embodiment of the type shown in FIG. 9 would be utilized. In this embodiment, stitching 36 is provided in an alternating rectangularly sinusoidal configuration so as to permit lateral access to the respective compartments for insertion and withdrawal of the tablets. Such a design would, in all other respects, conform to the embodiment of FIG. 5.

Figure 10:
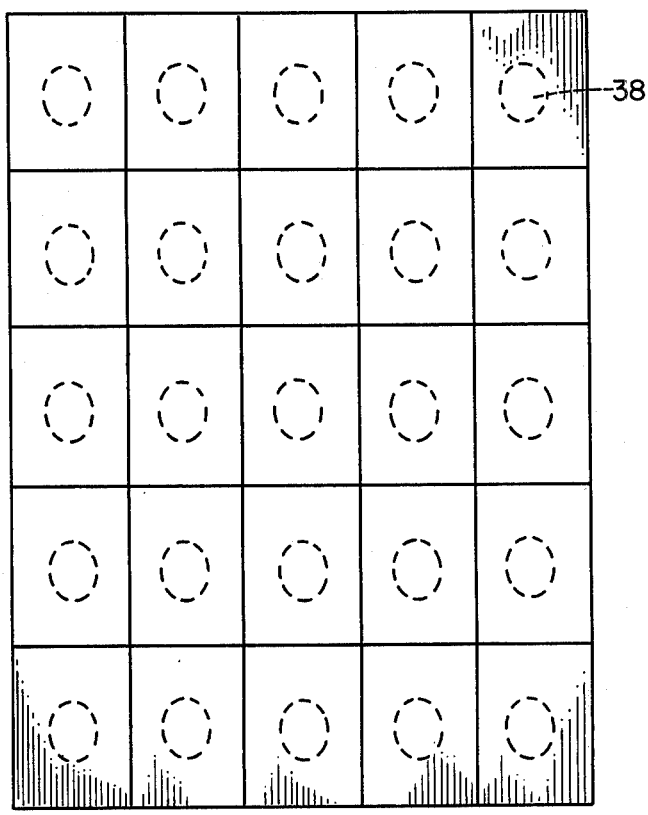
FIG. 10 is a schematic illustration of a package of tablets such as would be utilized in association with the present collar.

Shown in FIG. 10 is an illustration of the manner in which the tablets are supplied to the consumer, each pill being individually sealed within a plastic envelope 38, thus preserving the effectiveness of the tablets prior to their use.

It is to be noted that during those periods when protection through tablet use is not required, the present collar can be simply used as a restraining collar.

It is thus seen that the objects set forth in the Summary of the Invention are effectively attained by the invention as above set forth.

While there have been herein shown and described the preferred embodiments of the present invention, it will be understood that the invention may be embodied otherwise than as herein specifically illustrated or described and that within said embodiments certain changes in the detail and construction and the form of arrangement of the parts may be made without departing from the underlying idea or principles of this invention within the scope of the appended claims.

What is claimed is:

1. A refillable permanent collar for animals, comprising:

An elongated, flexible member having at the ends thereof a means for the securement of said ends about the neck of an animal, said member defining therein a multiplicity of internal compartments integral therewith, said internal compartments defining openings for the removeable frictional securement therein of deodorant or other medicinal substances in tablet form, wherein said flexible member further defines a multiplicity of vapor escape channels communicating with said internal compartments in order to permit the flow therefrom of chemical vapors from said tablets in a direction away from the fur of the animal.

2. The collar as recited in claim 1 in which said flexible member exhibits a smooth under surface suitable for comfortable contact with the neck of the animal, in which said internal compartments and said vapor escape channels comprise a multiplicity of passages molded within a unitary integrally formed structure in which the cross-section of said passages forming said internal compartments is conformable in dimension to a press-fittable insertion of said tablets thereinto.

3. The collar as recited in claim 2 in which the exterior surface of said flexible member exhibits a sinusoidal or undulating longitudinal cross-section.

4. The collar as recited in claim 1 in which said flexible member comprises:

a. a base strip adapted for comfortable contact with the neck of the animal;
   b. a center strip having formed therein said multiplicity of internal tablet-receiving compartments; and
   c. a top strip having formed therein said multiplicity of vapor escape channels, wherein said base strip, said center strip and said top strip are in sequential sealing abutment along a portion of the broad surfaces thereof to enable the insertion into said compartments and the removal therefrom of said tablets.

5. The collar as recited in claim 4 in which said stitching is configured in order to further define said internal compartments.

* * * * *